United States Patent
Zhong et al.

(10) Patent No.: US 10,740,415 B2
(45) Date of Patent: Aug. 11, 2020

(54) CONTENT RECOMMENDATION

(71) Applicant: Oath Inc., New York, NY (US)

(72) Inventors: Erheng Zhong, Sunnyvale, CA (US); Nathan Liu, Sunnyvale, CA (US); Yue Shi, Sunnyvale, CA (US); Suju Rajan, Sunnyvale, CA (US)

(73) Assignee: Oath Inc., New York, NY (US)

( * ) Notice: Subject to any disclaimer, the term of this patent is extended or adjusted under 35 U.S.C. 154(b) by 667 days.

(21) Appl. No.: 14/930,218

(22) Filed: Nov. 2, 2015

(65) Prior Publication Data
US 2017/0124200 A1   May 4, 2017

(51) Int. Cl.
*G06F 16/9535* (2019.01)
(52) U.S. Cl.
CPC .................. *G06F 16/9535* (2019.01)
(58) Field of Classification Search
USPC ........................................................ 707/722
See application file for complete search history.

(56) References Cited

U.S. PATENT DOCUMENTS

| | | | | |
|---|---|---|---|---|
| 7,685,192 B1* | 3/2010 | Scofield | ................ | G06F 16/954 707/709 |
| 8,301,623 B2* | 10/2012 | Chakrabarti | ........ | G06F 16/9535 707/723 |
| 8,560,528 B2* | 10/2013 | Herbrich | ........... | G06F 16/24573 707/722 |
| 8,620,909 B1* | 12/2013 | Rennison | ............. | G06F 16/319 707/723 |
| 10,180,968 B2* | 1/2019 | Steck | ................ | G06F 16/24578 |
| 2003/0110181 A1* | 6/2003 | Schuetze | ........... | G06F 17/30713 |
| 2013/0097153 A1* | 4/2013 | Barbieri | .................. | G06F 16/78 707/722 |
| 2015/0058320 A1* | 2/2015 | Zheng | .................... | G06F 16/22 707/722 |
| 2015/0187024 A1* | 7/2015 | Karatzoglou | .......... | G06Q 50/01 705/319 |
| 2016/0112737 A1* | 4/2016 | Johnston | .......... | H04N 21/44204 725/14 |
| 2016/0379132 A1* | 12/2016 | Jin | ......................... | H04L 67/02 706/12 |

OTHER PUBLICATIONS

Hu, Yifan, Yehuda Koren, and Chris Volinsky. "Collaborative filtering for implicit feedback datasets." Data Mining, 2008. ICDM'08. Eighth IEEE International Conference on. Ieee, 2008.*

Koren, Yehuda, Robert Bell, and Chris Volinsky. "Matrix factorization techniques for recommender systems." Computer 42.8 (2009).*

Johnson, Christopher C. "Logistic matrix factorization for implicit feedback data." Advances in Neural Information Processing Systems 27 (2014) (Year: 2014).*

(Continued)

*Primary Examiner* — Mohsen Almani
(74) *Attorney, Agent, or Firm* — Cooper Legal Group, LLC

(57) ABSTRACT

Briefly, embodiments of methods and/or systems for performing content recommendation are disclosed. For one embodiment, as an example, estimating relevance may include computing an inner product of latent factors corresponding to a plurality of users and features of one or more content items.

19 Claims, 3 Drawing Sheets

(56) References Cited

OTHER PUBLICATIONS

Gemulla, Rainer, et al. "Large-scale matrix factorization with distributed stochastic gradient descent." Proceedings of the 17th ACM SIGKDD international conference on Knowledge discovery and data mining. ACM, 2011. (Year: 2011).*

Bee-Chung Chen Deepak Agarwal, Pradheep Elango, Raghu Rannakrishnan "Latent Factor Models for Web Recommender Systems"; Yahoo! Research & Yahoo! Labs, 2010 (Year: 2010).*

Shi J, Wu B, Lin X. A latent group model for group recommendation. In2015 IEEE International conference on mobile services Jun. 27, 2015 (pp. 233-238). IEEE. (Year: 2015).*

Melville P, Mooney RJ, Nagarajan R. Content-boosted collaborative filtering for improved recommendations. Aaai/iaai. Jul. 28, 2002; 23:187-92. (Year: 2002).*

Hirooka, Yasuo, Takao Terano, and Yukicbi Otsuka. "Recommending books of revealed and latent interests in e-commerce." 2000 26th Annual Conference of the IEEE Industrial Electronics Society. IECON 2000. (Year: 2000).*

Girshick, et al, "Rich feature hierarchies for accurate object detection and semantic segmentation," Computer Vision and Pattern Recognition (CVPR), 2014 IEEE Conference, Jun. 23-28, 2014, 8 Pages.

Farfade, et al, "Multi-view Face Detection Using Deep Convolutional Neural Networks," ICMR '15, Jun. 23-26, 2015, 8 Pages.

Garcia, et al, Convolutional Face Finder: A Neural Architecture for Fast and Robust Face Detection, IEEE Trans. Pattern Analysis and Machine Intelligence, vol. 26, No. 11, Nov. 2004, 33 Pages.

Duffner, "Face Image Analysis with Convolutional Neural Networks," https://www.google.com/search?q=rich+feature+hierarchies+for+accurate+object+detection+and+semantic+segmentation&ie=utf-8&oe=utf-8#q=Face+Image+Analysis+with+Convolutional+Neural+Networks, 2007, 191 Pages.

* cited by examiner

100

200

CONTENT RECOMMENDATION

BACKGROUND

1. Field

This disclosure relates to recommending content items, such as, for example, news items, reports, creative works, movies, and so forth, to users of a computing and/or communication network, such as the Internet.

2. Information

In a contemporary Internet environment, Internet users may find themselves inundated with an ever-expanding set of content choices, such as news articles, reports, movies, short stories, and so forth. Thus, in many instances, although an ample supply of relevant content may be accessible via the Internet, some Internet users may spend an inordinate amount of time sifting through content items in an attempt to separate relevant content from content having little or no relevance to a particular user, as an example. Accordingly, content recommendation systems have been developed in an effort to suggest content items that may be of interest and/or relevance to a user, such as an Internet user, and to direct irrelevant content away.

However, at times, efficacy of a content recommendation system may be at least partially dependent upon factors such as, for example, a user's history in selecting content items, which may form a basis upon which additional content items may be recommended. For example, a user, such as an Internet user, who occasionally views news items pertaining to a particular sport, may benefit from recommendation of additional content items pertaining to the particular sport. However, recommending content to a user who interacts little with news items, for example, may pose a challenge to a content recommendation system. In these instances, and others, content recommendations that may be at least partially based on a small set of interactions may give rise to content recommendations that are irrelevant and/or otherwise of little use.

BRIEF DESCRIPTION OF DRAWINGS

Claimed subject matter is particularly pointed and/or distinctly claimed in the concluding portion of the specification. However, both as to organization and/or method of operation, together with objects, claimed features, and/or advantages thereof, claimed subject matter may be understood by reference to the following detailed description if read with the accompanying drawings in which:

Figure 1:
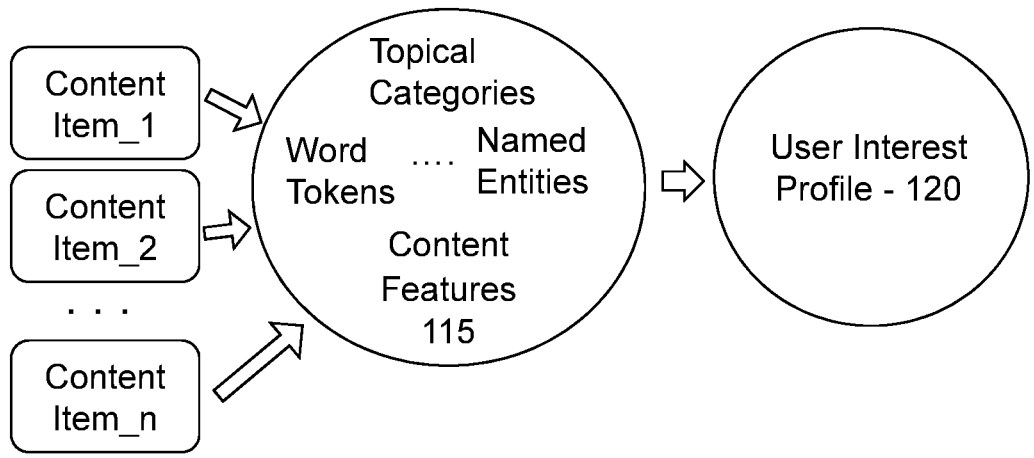
FIG. 1 is a block diagram showing a mapping of content items to content features and mapping of content features to a user interest profile according to an embodiment.

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like, means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and distributing the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of a network, in an embodiment. As mentioned, one non-limiting, but well-known example, comprises the Hadoop distributed computing system, which refers to an open source implementation of a map-reduce type architecture, but may include other aspects, such as the Hadoop distributed file system (HDFS). In general, therefore, Hadoop and/or similar terms may refer to an implementation scheduler for executing large processing jobs using a map-reduce architecture.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed to imply or suggest that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to additionally imply that two or more components are not necessarily in direct contact, but nonetheless are able to cooperate and/or interact. The term "coupled" is also understood generically to mean indirectly connected, for example, in an appropriate context.

The terms "and," "or," "and/or," and/or similar terms, as used herein, include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms is used to describe any feature, structure, and/or characteristic in the singular and/or may also be used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term "sub-network" and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices.

In this context, the term "transparent" refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices capable of communicating with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term "Internet Protocol," "IP," and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term "World Wide Web" ("WWW" or "Web") and/or similar terms may also be used, although these refer to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term "Hypertext Transfer Protocol," "HTTP," and/or similar terms is intended to refer to any version, now known and/or later developed. It is likewise noted that in various places in this document, substitution of the term "Internet" with the term "World Wide Web" ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may, without limitation, provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to hundreds of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, digital image, a contiguous portion of the digital image, just to name a few examples. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms, refer to any electronic file and/or electronic document, such as an electronic digital image, and/or a contiguous portion of an electronic digital image, such as may be accessible via a network, including by specifying a URL for accessibility via the Web, for example. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "relevance," "parameter," "factor," "latent factor," "rank," "interaction," "click," "content," "content item," and/or similar terms are meant to refer to signals, signal value levels, and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio, read a news item or portion of a creative work, or see an image, as examples) is referred to, with respect to the user, as "consuming" content, "consumption" of content, "consumable" content and/or similar terms. For one or more embodiments, an electronic document may comprise a Web page coded in a markup language, such as, for example, HTML (hypertext markup language). In an embodiment, content may comprise, for example, text, images, audio, video, and/or other types of electronic documents and/or portions thereof, for example.

Media networks, such as the Yahoo!™ network, for example, may be increasingly seeking ways to attract users to their networks and/or to retain users within their networks for extended periods of time. A media network may, for example, comprise an Internet Web site and/or group of Web sites having one or more sections. For instance, the Yahoo!™ network includes Web sites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or to provide other considerations to a media network in return for advertising to users, for example, via that media network, its partners, and/or subsidiaries. In implementations, a media network may suggest that a user interact with a website to complete an online "profile," which may comprise an explicit description of a user's interests, status, demographics, and so forth. A media network may thus, based at least in part on user's voluntarily-provided profile, recommend content that may be relevant and/or interesting to the user. It should be noted that a user profile may be utilized for other purposes, and claimed subject matter is not limited in this respect.

In another implementation, a media network may beneficially obtain implicit feedback from a user based, at least in part, on a user's interactions, such as with a website, for example, to read news articles, obtain product reviews, play games, read opinions and creative works, view video clips and movies, hear audio tracks, and so forth. In an embodiment, based at least partially on a user's implicit interaction, such as with a media network, wherein interactions may comprise, for example, a user's selection of one or more hyperlinks, selection of icons (e.g., a user clicking on an icon), viewing an electronic document for greater than a threshold length of time, or the like, a media network may suggest or recommend additional content that may be of interest to a particular user. For example, a user who frequently reads news items pertaining to tennis may benefit from additional content related to tennis, for example.

In implementations, a media network may utilize a collaborative filtering approach to recommend content to a user. In one possible example of a collaborative filtering approach, if a number of users who at least occasionally consume or otherwise interact with news items pertaining to tennis, for example, may also visit websites pertaining to travel, then there may be a measurable probability that a new online visitor to a tennis-related site (e.g., a user who does not appear to have visited the tennis website in the past) may also be interested in travel websites. Further, in many instances, content recommendations utilizing additional parameters derived from implicit user interactions with content items may bring about increasingly relevant recommendations. Thus, for example, a user who at least occasionally visits a tennis-related website and one or more travel clothing websites, for example, may have a measurable probability of benefiting from being presented with travel-related content, advertisements, offers, and so forth. It should be noted that this is but one example of a wide variety of content recommendation use cases that may benefit from collaborative filtering, and claimed subject matter is not limited in this respect.

However, at times, collaborative filtering approaches may also bring about relatively inaccurate content recommendations. Inaccuracies may be brought about, for example, responsive to obtaining sparse and/or imprecise parameters pertaining to a user's interaction with content. In one possible example, a bargain-hunting user who visits a tennis-related website may do so primarily to obtain discount tennis shoes. In such an instance, that user, as an example, may not be particularly likely to benefit from offers for travel and/or travel-related websites. Accordingly, at times, it may be beneficial to a user and/or a media network to employ additional and/or alternative approaches other than collaborative filtering for content recommendation.

Thus, in particular embodiments, as described further herein, for example, user interactions with content items may comprise both "positive" and "negative" interactions, which may give rise to an increase in available parameters pertaining to a user's interaction with content, such as Internet-related content. For example, in particular embodiments, a user actively selecting to view a particular news item may comprise an example of a positive interaction. Likewise, a user selecting or clicking on an icon, clicking on a hyperlink, or viewing a news item, image, and/or other content item, for example, may also comprise an example of a positive interaction. Additionally, negative interactions, may comprise, as examples, a user skipping an opportunity to select or click on an icon, a user spending a relatively short period of time to view an article, and/or performing one or more other actions indicating that a user may have lesser interest in particular content items. Positive and/or negative interactions may be employed to permit a content recommendation system to suggest content to a user more likely to be relevant and/or interest as may be desired. A content recommendation system may also make use of other indicators of user interest, and/or disinterest, and claimed subject matter is not limited in this respect. Further, in embodiments, positive interactions may be ranked differently than negative interactions, for example.

In particular embodiments, content items may be evaluated so as to identify content features which may, for example, indicate that a content item is more likely to be of interest. A content feature may refer to a perceptible, such as a human perceptible, aspect of a content item that may operate to differentiate content items from one another. Accordingly, content features may comprise, for example, topical categories to which a content item may belong (e.g., sports, such as football, baseball, track and field, etc.), a set of named entities in the content item (e.g., a famous author, such as Rudyard Kipling, Edgar Allan Poe, Walt Whitman, etc.), word tokens (e.g., words occurring in a content item, such as noun-phrase combinations, bigrams, trigrams, etc.). Content features may comprise other indicators of the constituent elements that may form a particular content item. Content features may include a large variety of additional features, such as a country or region in which a current event or news item transpired, and claimed subject matter is not limited in this respect.

In certain embodiments, features of a content item may be mapped into a feature space, which may refer to a vector space, such as a multidimensional vector space, comprising a potentially large variety of representations, such as numerical representations, of content features. Thus, in some embodiments, a feature space may possibly comprise thousands, millions, or an even larger number of signals and/or states for perceptible, such as a human perceptible, features of content items that may operate to differentiate content items from one another, for example. Further, in embodiments, features of a user profile may also be mapped into a similar or even identical feature space. In embodiments, one or more measures may likewise be utilized to indicate relevance to a user. Thus, in ascertaining if a content item is relevant to a user's interests, for example, one or more measures to indicate potential correspondence among one or more aspects (e.g., features) of a user profile and features of a content item, mapped into a feature space, may be employed. Likewise, in particular embodiments, content exhibiting greater than a threshold value or indication of potential relevance (e.g., greater likelihood) may be served to the user. Likewise, content exhibiting less than a threshold value or indication of potential relevance (e.g., less likelihood) may be omitted or otherwise not designated for display to a user. It is contemplated that in one or more embodiments content may be designated for display to a user, or withheld from a user's view based, at least in part, on a number of other possible factors as well, such as content comprising, for example, age-inappropriate subject matter (just to name an example), and claimed subject matter is not limited in this respect.

In particular embodiments, constructing feature spaces comprising user interests may permit content recommendation that is relatively aligned with a user's interests even if sparse and/or imprecise parameters pertaining to a user's interaction with content (e.g., news items) are available. Thus, in implementations, even if a user comprises a first entity to interact with a content item, the content item may be deemed more likely relevant and/or of interest if an overlap exists in the features of a user interest profile and a content item's features, for example. Additionally, as will be described later herein, user-interest profile building methods may be constructed from, for example, a combination of explicit and/or implicit user interactions with content.

In particular embodiments, constructing profiles for individual users may be scaled in a manner that may permit, for example, tens of millions of users to be served in a single day, for example. However, embodiments are not limited to serving a particular number of users in a given period of time. Additionally, content features, based at least in part upon which user profiles may be built, for example, may comprise thousands of word tokens and/or n-grams such as bigrams and/or trigrams, for example.

In an embodiment, implicit feedback may represent a more plentiful source of user interactions with content items than a user's voluntarily-submitted profile. For example, if a user selects and/or clicks on a content item, a signal sample value corresponding to the selection may indicate a user's potential interest in that item. Accordingly, it may be inferred and/or imputed that one or more features of the selected content item are more likely to be relevant to a user's interests. Additionally, in embodiments, multiple forms of feedback may be utilized, such as time spent viewing a particular content item, and/or other indications of a user's interests. In embodiments, negative feedback, such as a user skipping an opportunity to click on a link, for example, may likewise provide an enhancement to a discriminative capability of a content recommendation system. Thus, negative feedback parameters pertaining to a user's interaction with content may impart additional benefits and/or advantages, and claimed subject matter is not limited in this respect.

In embodiments, a method for performing personalized news recommendations, for example, may be based, at least in part, on a paradigm of picking interest sectors and/or user profiles that may be utilized to retrieve content items for a user's consumption that are likely to be relevant and/or of interest. In an embodiment, a user interest inference may refer to an estimate of a user's interests based, at least in part, on a user's implicit interactions with content, such as Internet content, as well as a user's explicit interactions with, for example, Internet content, and the implicit and/or explicit interactions of other users whose interactions may imputed upon a user, for example. A user interest inference may refer to estimates of a user's interests based at least partially on other approaches, and claimed subject matter is not limited in this regard.

In embodiments, a user interest inference may be combined with a latent factor model to generate, for example, content recommendations. In embodiments, a latent factor model may refer to possible user interests that may not be immediately observable, such as via a user's explicitly-expressed profile. Embodiments may utilize negative feedback of a user's interaction with content items to compute a latent factor model, which may, for example, comprise a departure from a typical approach (e.g., that may exclude use of negative feedback). In embodiments, one or more vectors of latent factors, which may be projected into a latent feature space may be employed. A vector comprising content features may be projected into a similar or perhaps identical feature space. An inner product of latent factors (e.g., of an individual user) and a content item may be utilized to indicate more likely relevance between a user's interest and, for example, a content item. In certain embodiments, a beneficial aspect of such an approach may, for example, give rise to sharing of latent factors across potentially multiple users of a user set. Thus, even interests of users with sparse interaction with content items may be evaluated with a relatively rich content feature interest vector in an embodiment, for example.

In this context, a latent factor refers to a signal sample value corresponding to a single, atomic (e.g., irreducible) interest of a particular user, such as user 1, user 2, and so forth. Also in this context, a latent factor refers to a user's interest that is not immediately apparent (e.g., by inspection) and may be inferred by imputing interests based, at least in part, on a user's interaction with other content items, even seemingly unrelated content items. Thus, in one possible example, a user's potential interest in travel may comprise a latent factor that is imputed based, at least in part, on observing a user's interaction with tennis websites, and a propensity of other users, who also interact with tennis websites, to also interact with travel-related websites.

FIG. 1 is a block diagram showing a mapping of content items to content features and mapping of content features to a user interest profile according to an embodiment 100. In FIG. 1, content item_1, content item_2, and content item_n may comprise any number of content items, such as news stories, technical reports, creative works, audio and/or video files, and so forth. It is contemplated that content item_1 through content item_n may comprise a large number of content items, such as, for example, tens of millions of content items, and claimed subject matter is not limited to any particular numerical range of content items, such as may be served to a user, for example. Content items of FIG. 1 may include numerous content features 115, such as topical categories, which may refer to categories organized in a hierarchical structure, such as a tree, although claimed subject matter is intended to embrace all types of organization and/or taxonomies of topical categories. Content features 115 may also include word tokens, which may refer to words, such as bigrams, trigrams, word phrases, and so forth, present in a content item. Content features 115 may also include, named entities, which may refer entity extraction to locate and classify elements of, for example, content item text, in defined categories. Content features 115 may also include additional human-perceptible distinguishing features, and claimed subject matter is not limited in this respect. In embodiments, content features may number into the thousands, for example, as individual content items may include detailed and/or complicated technical reports, for example, and claimed subject matter is not limited to a particular number of content features. Content features 115 may, for example, be mapped to a feature space, which may comprise interests that may be attributed to an individual user, for example. In embodiments, such mappings may, for example, permit arrangement of user interests based, at least in part, content features, word tokens, named entities, and so forth.

Figure 2:
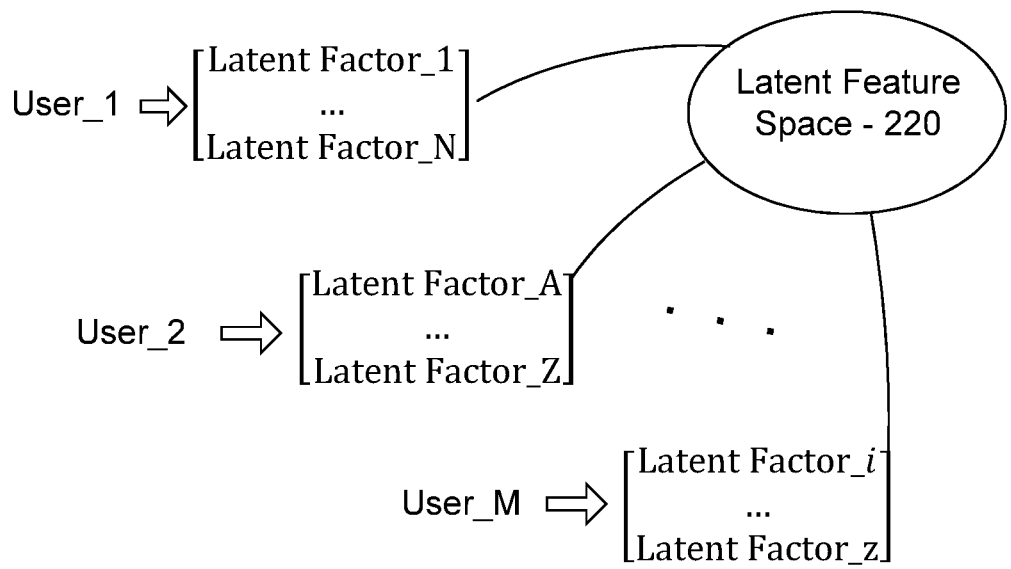
FIG. 2 is a block diagram showing a mapping of user latent factors to a latent feature space according to an embodiment.

FIG. 2 is a block diagram showing a mapping of user latent factors to a feature space according to an embodiment 200. In FIG. 2, a vector of latent factors, such as latent factor_1 through latent factor N, may comprise latent factors attributable to user_1. Likewise, latent factor_A through latent factor_Z may be attributable to user_2. Likewise, latent factor_i through latent factor_z may be attributable to user_M. Also as shown in FIG. 2, interests for user_1 through user_M, along with additional users, may be mapped to a feature space, such as feature space 220, which may, for example, comprise a latent feature space into which, for example, a variety of users may be mapped. As previously described and also explained in more detail, in one possible embodiment, mapping of a variety of users permits a sharing of latent factors across users. It should be noted, however, that claimed subject matter is not limited, for example to mapping of particular users or a variety of users.

In particular embodiments, a content recommendation system may employ mapping of user interests to a similar or even an identical feature space so as to bring about effective retrieval of content items that are more likely to be relevant and/or of interest to users. Accordingly, in an embodiment, for example, it may be assumed that there are m users, n items, and f item features, where m, n, and f comprise positive integer numerals. Further, also in an embodiment, it may be assumed that a user may be, at times, presented with a ranked list of items, with respect to which a user may provide implicit and/or explicit feedback, such as, for example, clicking on an item in a ranked list, and/or skipping (e.g., refraining from clicking) an item, such as a hyperlink, in a ranked list. Thus, implicit positive and/or negative feedback from users with respect to content items may comprise a sparse matrix C, such as a matrix having dimensions m×n, in which $C_{ij}=+1.0$ refers to a user ($u_i$) clicking on an item $x_j$, and in which $C_{ij}=-1.0$ refers to a user ($u_i$) skipping an item $x_j$. In embodiments, matrix C comprises an array, such as a two-dimensional array of stored values, such as binary signal sample values, arranged as physical states stored in an area of memory accessible by, for example, one or more computer hardware-type processing units. In embodiments, elements of a matrix may comprise a logical association with one another but need not be co-located within a physical memory structure.

A second matrix, X, may also be constructed, wherein X may comprise n×f dimensions in which, in particular embodiments, X also comprises a sparse matrix and wherein entries of matrix X correspond to a content feature of a content item in an embodiment. Accordingly, in an embodiment, a profile may be constructed in which estimates, which may be computed substantially in accordance with Ω, may be formed from a sparse matrix substantially according to expression 1, as below:

$$\mathcal{P} \in \mathcal{R}^{m \times f} \text{ from } X \text{ and } C, \text{ e.g., } \mathcal{P} = \Omega(C, X) \quad (1)$$

Thus, in an embodiment, suitable estimates may be computed substantially in accordance with expression 2, below:

$$\min_\Omega \ell \ (\Omega, C, X) + \lambda R(C, X) \quad (2)$$

In which a loss function may comport with $\ell$. A regularization parameter may comprise $\lambda$, and R may comprise a regularization function to at least partially affect complexity.

In particular embodiments, an intuitive statistical approach to constructing profiles may combine features of items clicked by a user, such as utilizing, such as term frequency, as one example. In general, if a user interacts with content items comprising a specific feature, that feature may potentially be highly relevant to this user and the user may look favorably on reading and/or reviewing other items that also comprise the feature. Accordingly, a user interest profile ($p_i$), in feature space 120 of FIG. 1, for example, may be represented as a vector over content features, given by expression 3, below:

$$p_i = \Sigma_{C_{ij}=1} x_j \quad (3)$$

In which $C_{ij}$ refers to a user action, such as, for example, a user clicking or skipping an item and in which $x_j$ refers to a content feature, such as content features 115 of FIG. 1.

It should be noted, however, that some content features may be quite common, such as stop words. Hence, utilizing highly common features, such as stop words, as one example, to build a user profile may yield less fruitful results. Accordingly, it may be useful to introduce normalization strategies to adjust a value of a feature measured via one or more normalization approaches in an embodiment. A first normalization approach may correspond to a classical document vector approach, such as using term frequency-inverse document frequency (TF-IDF), for example. TF-IDF may, in effect, penalize content features common to a number of users and highlight specific, less-common features that may distinguish one user from another. Thus, for an embodiment, in accordance with a TF-IDF approach, a score for an individual content feature, $p_{ik}$, may be expressed substantially according to expression 4, below:

$$p_{ik} = \overline{p}_{ik} \times \log \frac{m}{|\{\overline{p}_c : \overline{p}_{ck} > 0.0\}|} \quad (4)$$

$$\overline{p}_{ck} = \Sigma_{C_{ij}=1} x_{jk} \quad (5)$$

Wherein $x_{jk}$ corresponds to an element of a content feature vector x. $C_{ij}$ corresponds to an indicator such as, for example, that user i clicked or skipped item j, for example. Additionally, $\overline{p}_{ck}$ corresponds to the value of the k-th feature of user c, and $\overline{p}_c$ corresponds, at least in some embodiments, to the vector formed from $\overline{p}_{ck}$. Thus, the summation of expression 5 represents all corresponding feature signal sample value levels for content items clicked by user c with respect to feature k. $P_c$ corresponds to the vector of $\{p_{ck}\}$, for k=1 to f. Consequently, as may be interpreted from expressions 4 and 5, if a feature is common to many users, such as a sport that has wide appeal, for example, the quantity in the denominator of expression 4 may begin to comprise a larger value which may, in turn, decrease $p_{ik}$.

In an embodiment, a statistical approach that substantially accords with a Chi-Square evaluation may be utilized to select features, which may comprise increased relevance to a user as compared to an expected value. In implementations, increased relevance may imply that if, for example, one user reads news comprising a particular feature (e.g., soccer, stock market predictions, etc.) at a rate that is statistically significantly above an average rate, that feature may be included in a user interest profile and in a feature space, such as feature space 120 of FIG. 1. More formally, a score of a feature may be expressed using expression 6, below:

$$p_{ik} = \frac{\overline{p}_{ik} + \kappa}{e_{ik} + \kappa} \quad (6)$$

$$e_{ik} = \Sigma_k \overline{p}_{ik} \times \frac{\Sigma_c \overline{p}_{ck}}{\Sigma_k \Sigma_c \overline{p}_{ck}} \quad (7)$$

In which κ of expression 6 represents a smoothing term, which may, in particular embodiments, reduce uncertainty involved in computation of relatively small values of $e_{ik}$. An advantage of the a Chi-Square approach, such as indicated in expressions 6 and 7, may comprise one or more advantages over a TF-IDF test in that as a result of being a statistical process, it may be possible to better estimate confidence of a feature by utilizing a "z" test, which may be described utilizing expression 8 below:

$$z_{ik} = \frac{\log(\bar{p}_{ik} + \kappa)}{\sqrt{e_{ik} + \kappa}} \quad (8)$$

In embodiments, generative (e.g., heuristical) statistical approaches exhibit desirable properties such as being relatively intuitive, for example, as well as computationally efficient. However, particular statistical approaches may be constructed for limited (such as ad hoc) purposes and may not comprise a capability to universally utilize negative feedback signal values. Accordingly, at least in some embodiments, by not considering negative user-content item feedback, use of statistical approaches may bring about a misinterpretation of relevance of a feature to a user. For example, such approaches may lack or reduce an ability to make use of discriminative user interests.

To bring about user profiles that may comprise discriminative user interest features, as previously mentioned, approaches may be expected to utilize positive and negative user feedback of content item interaction. In particular embodiments, training parameters may be constructed for a given user's "click" or "skip" feedback on a displayed item, for example. In certain embodiments, content items may correspond to a feature vector with labels such as "click" and "skip." As a consequence of utilizing an inner product between user profile features and content item features to bring about a relevance score for ranking, a linear approach may be used, for example, in which computed coefficients are employed as user profiles.

In general, it may be advantageous to form or construct a vector $p_i$ for a given user substantially in accordance with an objective function given in expression 9 below:

$$\min_{\mathcal{P}} \sum_{i=1}^{m} \sum_{j=1}^{n} I_{ij} \ell(C_{ij}, p_i x_j^T) + \lambda R(p_i) \quad (9)$$

wherein I corresponds to an indicator matrix. $I_{ij}$ may be set approximately in the range of 1.0 if $C_{ij}$ is not empty, and $I_{ij}$ may be set approximately in the range of 0.0 otherwise. A number of approaches may be utilized to arrive at $p_i$, such as by utilizing differing loss functions and regularization terms, such as linear support vector machines, logistic regression, linear discriminant analysis, and so forth. In particular embodiments, however, as an example, logistic regression utilizing an L2-norm regularization may give rise to a suitable learning approach. Thus, utilizing such an approach, it may be useful to employ an objective function of expression 10, below:

$$\min_{\mathcal{P}} \sum_{i=1}^{m} \sum_{j=1}^{n} I_{ij} \gamma(C_{ij}, p_i x_j^T) + \lambda \|p_i\|_2 \quad (10)$$

wherein, $\gamma(x) = \log(1+e^{-x})$ and corresponds to the logistic loss.

In embodiments, a stochastic gradient descent (SGD) approach may be utilized to potentially bring about greater increases in efficiency and to reduce effects from parameter noise brought about by imprecise and/or partial measurement of implicit user feedback, for example. In addition to comprising a property of selecting features that may be preferred by a user, an additional advantage of a stochastic gradient descent approach may comprise an ability to identify content features with which users may not want to interact. However, despite advantages, if a user interacts with a few select content items, for example, meaningful results may be limited. For example, for individual users, rare and/or noisy observations may not give rise to profiles that adequately generalize, for example, to additional users, additional features of content items, and so forth.

Accordingly, in one or more embodiments, a latent factor approach may be utilized to construct user profiles utilizing parameters from a plurality of users. Thus, users' interests may be distinguished from one another while learning from interaction parameters of a plurality of other users, for example. Accordingly, in embodiments, matrix factorization may be utilized to build user profiles. In particular, user profiles may be decomposed into, for example, two components. A first component may comprise a common mapping from content item features to latent factors, which may be shared by a number of users. A second component may comprise latent factors of, for example, the particular user. Additionally, as membership of item features with respect to latent factors may be stable for a plurality of users, common latent factors (e.g., a first component) may be considered as a bridge which may be utilized to propagate or link user interaction parameters across a plurality of additional users. Thus, users for whom interaction parameters may be limited may benefit from interaction parameters of other users, for example. Further, a user's latent factor membership distribution may be specific (e.g., a second component), which may thereby permit reflecting a plurality of user's personalized interest as well.

To more formally describe a latent factor approach, latent factors for individual users may be measured, such as $u_i \in \mathcal{R}^{1 \times k}$. A latent factor matrix for m users of a set may be characterized as $\mathcal{U} = \{u_i\}_{i=1}^{m}$. To construct a correlation matrix among content item features and latent factors, an additional latent factor matrix given by $S \in \mathcal{R}^{k \times f}$ may be utilized to map content item features to latent factors. Further, a user profile matrix may be constructed as $\mathcal{P} = \mathcal{U} S$, for example. Thus, at least in some embodiments, a latent factor approach may be formulated as an attempt to obtain $\mathcal{U}$ and $S$, for example. Responsive to formulating a latent factor approach into a matrix factorization framework, $\mathcal{U}$, $S$ may be utilized to approximate interaction records $C$ as $C \approx \mathcal{U}, S, X^T$. Thus, by replacing $\Omega$ in expression 2 as $\mathcal{U}$ and $S$, we obtain the objective function of expression 11, below:

$$\min_{\mathcal{U},S} \ell(\mathcal{U} SX^T, C) + \lambda_u R_u(\mathcal{U}) + \lambda_s R_s(S) \quad (11)$$

wherein $\lambda_u$ and $\lambda_s$ indicate regularization parameters for $\mathcal{U}$ and $S$, respectively.

Figure 3:
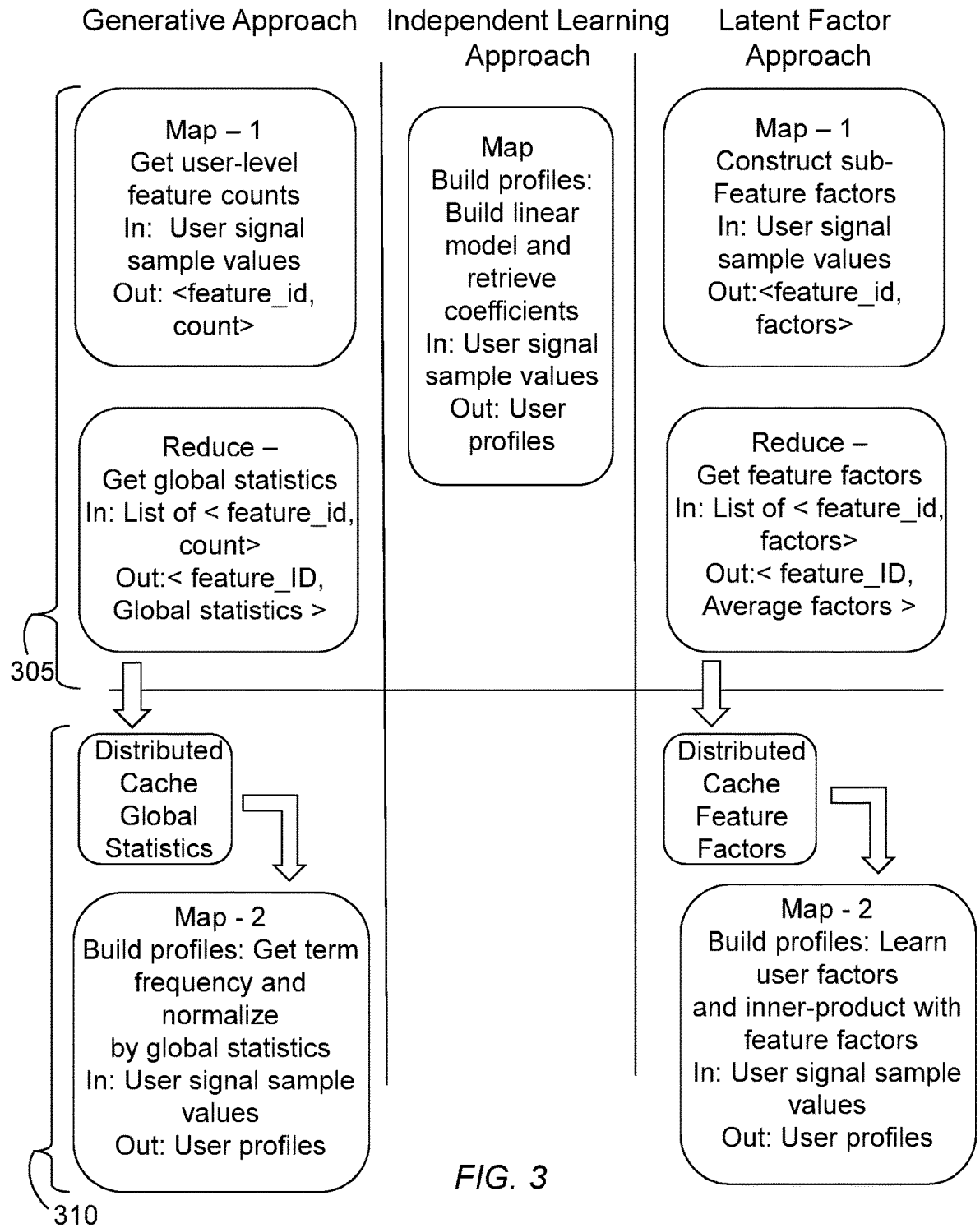
FIG. 3 is a block diagram showing a generalized methodology for evaluation of parameters pertaining to a user's interaction with content according to embodiments.

In particular embodiments, it may be possible to choose different loss functions and regularization terms as desired so that particular tasks may be performed. For example, an L2-norm, as shown in FIG. 3 may be employed to accommodate differing types of feedback. In one possible example, feedback may be rated utilizing a square loss function, which may utilize an objective function substantially in accordance with expression 12, below:

$$\min_{\mathcal{U},S} \Sigma_{i=1}^{m} \Sigma_{j=1}^{n} I_{ij}(C_{ij} - u_i S x_j^T)^2 + \lambda_u \|\mathcal{U}\|_2 + \lambda_2 \|S\|_2 \quad (12)$$

In another possible example, feedback may be rated utilizing a logistic loss function for binary feedback, such as a "click" versus "skip" feedback approach, such as given in expression 13 below:

$$\min_{\mathcal{U},S} \Sigma_{i=1}^{m} \Sigma_{j=1}^{n} I_{ij} \gamma (C_{ij} u_i S x_j^T)^2 + \lambda_u \|\mathcal{U}\|_2 + \lambda_s \|S\|_2 \quad (13)$$

In another embodiment, feedback may be rated utilizing an area-under-the-curve (AUC) approach in which implicit feedback, such as user clicks, for example, are available. In an AUC approach, an objective function according to expression 14 may comprise:

$$\min_{\mathcal{U},S} \sum_{i=1}^{m} \sum_{j \in I_i^+} \sum_{k \in I_i^-} \ln \sigma(u_i S x_j^T - u_i S x_k^T) + \lambda_u \|\mathcal{U}\|_2 + \lambda_s \|S\|_2 \quad (14)$$

In which $$\sigma(x) = \frac{1}{1 + e^{-x}}$$

and represents the logistic transform, and wherein $I_i^+$ comprises indices of positive feedback signal sample value levels (e.g., clicks), and wherein $I_i^-$ comprises indices of negative feedback signal sample value levels.

In particular embodiments, a stochastic gradient descent approach may be utilized. Gradients with respect to $\mathcal{U}$ and S, for example, may be computed substantially according to a square loss approach, such as shown in expressions 15-16, below:

$$\nabla u_i = (u_i S_j^T - C_{ij}) x_j S^T + \lambda_u u_i \quad (15)$$

$$\nabla S = (u_i S_j^T - C_{ij}) u_i^T x_j^T + \lambda_s S \quad (16)$$

In particular embodiments, gradients with respect to $\mathcal{U}$ and S, for example, may be computed according to a logistic loss approach, such as shown in expressions 17-18, below:

$$\nabla u_i = \frac{-C_{ij} x_j S^T}{1 + e^{C_{ij} u_i S x_j^T}} + \lambda_u u_i \quad (17)$$

$$\nabla S = \frac{-C_{ij} u_i^T x_i^T}{1 + e^{C_{ij} u_i S x_j^T}} + \lambda_s S \quad (18)$$

In certain embodiments, gradients with respect to $\mathcal{U}$ and S, for example, may be computed according to an AUC approach, such as shown in expressions 19-21, below:

$$\nabla u_i = \frac{e^{-y_{ijk}}}{1 + e^{-y_{ijk}}} (x_j - x_k) S^T - \lambda_u u_i \quad (19)$$

$$\nabla S = \frac{e^{-y_{ijk}}}{1 + e^{-y_{ijk}}} u_i^T (x_j - x_k)^T - \lambda_S S \quad (20)$$

$$y_{ijk} = u_i S x_j^T - u_i S x_k^T \quad (21)$$

In an implementation, to compute gradients for AUC loss, for example, it may be useful to employ a bootstrap strategy that samples a positive and negative feedback pair in an approximately random fashion. Updates of $\mathcal{U}$ and S may be performed alternatively until convergence is achieved utilizing, for example, expressions 22 and 23, below:

$$\mathcal{U} \leftarrow \mathcal{U} - \epsilon \nabla \mathcal{U} \quad (22)$$

$$S \leftarrow S - \epsilon \nabla S \quad (23)$$

Wherein, at least in particular embodiments, S may be updated on a user-by-user basis, for example in an implementation, a user set may be randomly shuffled to rearrange an order of input parameters, such as user click interactions or other implicit and/or explicit feedback. For an interaction of a particular user, a user's latent factors may be updated using SGD without disturbing latent factor mapping of content items (S). Responsive to renewing a user's latent factors with a group of interactions, S may be updated. In embodiments, it is contemplated that an interaction record may be related to a small number of item features and may not significantly impact latent factor values. Accordingly, S may be updated, for example, a single time for a given user of a user set. By updating only sparingly, savings in computation time may be realized, which may be useful in real-world systems. In embodiments, updates to S and $\mathcal{U}$ may be performed alternatively until the matrices converge.

As indicated, as a result of a latent factor approach, a content feature factor matrix S may be shared across a group of users. Thus, by utilizing a content feature factor matrix to address users for whom limited interactions with content correspondingly limits parameters available, users may benefit from interaction parameters of other users, for example, in a user set. Thus, even if a user has a small number of features via, for example, his or her own interaction with content items, embodiments may nonetheless extrapolate a user's profile to a wide range of features by utilizing a feature factor matrix S. Accordingly, a latent factor evaluation may contribute to improving user interest profiles. Additionally, correlation between user similarities ($\mathcal{U} S \mathcal{X}^T$) and interactions (C) may increase by using, for example, both positive and negative feedback. Further, as selected features, over time, potentially exhibit higher discriminative ability, content recommendation accuracy may potentially be further enhanced.

FIG. 3 is a block diagram showing a generalized methodology for parameter analysis according to embodiments 300. FIG. 3 may accommodate, for example, a number of users (m) that may number into the millions, tens of millions, or an even greater number. Further, FIG. 3 may accommodate virtually any number of content items (n), such as billions, tens of billions, hundreds of billions, etc. Thus, a content recommendation system may be designed to operate in a scalable manner and utilize, for example, the Hadoop distributed computing system, which employs a map-reduce type of architecture. In an implementation that utilizes Hadoop, parameters may be partitioned based, at least in part, on individual users and stored and/or made accessible to a potentially large number of hardware processing platforms. Utilizing Hadoop, computation of content recommendation, such as one or more generative approaches, one or more independent approaches, and one or more latent factor approaches, are described herein. In implementations, computation of user profiles may be extracted into two portions, such as a map portion and a reduce portion.

In implementations, hardware processing platforms may advantageously operate by communicating with one another to exchange user and/or feedback parameters. As generally relates to FIG. 3, in a map phase, a partial computation based, at least in part, on partial user interaction parameters may be executed. In a reduce phase, outcomes may be combined for, respectively, a generative, an independent, and/or a latent factor approach. Additional operations may utilize local parameters, such training and/or refining of user coefficients (e.g., coefficients for individual users) to be used in an independent learning approach, for example. In a latent factor approach, additional operations may comprise forming of user latent factors.

In particular embodiments that utilize a generative technique, such as shown in 305 of FIG. 3, a map computation phase may comprise computing feature counts for individual users followed by combining of computed parameters in the reduce phase. In the reduce phase, global statistics, such as the document frequency for TF-IDF, for example, and a general expectation of individual features of a chi-square test may be computed. In embodiments, as these statistics may comprise relatively small value levels, statistics may be loaded into a distributed cache, such as in 310, which may be accessible by potentially all, for example, of the Hadoop hardware computing platforms. A second map phase, shown as Map—2 in FIG. 3, may comprise computing term frequency locally for individual users as well as computing global statistics to normalized values and obtaining profiles for individual users.

In particular embodiments that utilize an independent learning technique, individual users may be considered independently utilizing parameters relevant to an individual user. Accordingly, in the independent learning technique of 305 in FIG. 3, an initial operation in building profiles may comprise utilizing a logistic regression in a map phase, such as by way of employing the objective function of expression 10. Additional computations may comprise training parameters of a global logistic regression technique and using the coefficients generated from training as initial profiles for individual users.

In particular embodiments that utilize a latent factor technique, such as shown in 305 of FIG. 3, an objective may be to construct feature factors S that may be shared by the plurality, or potentially all, for example, users in a user set. Accordingly, an initial map phase (Map—1) may comprise a partial computation, $\hat{S}$ and $\hat{U}$, based, at least in part, on individual user's parameters from a local Hadoop hardware computing platform. Accordingly, a reduce phase may comprise an averaging strategy, for example, for obtaining feature factors, such as $S=AVG(\hat{S})$. A second map portion, shown as Map—2 in FIG. 3, may begin with loading S into a distributed cache and training $u_i$ for individual users utilizing, for example, expression 22 with a static or fixed vector for S. Map—2 may also comprise computing an inner product between users' and features' latent factor to obtain profiles. Considering that correlation between latent factors and features may be stable over a relatively long term, S may be constructed using feedback from active users and then constructing factors for additional users, such as currently inactive users.

To bring about communication and storage of user parameters, a message format may be employed for signal sample value levels using protocol buffers. In one example, a user signal sample value may comprise a record having a user ID, a timestamp, an item ID with features, as well as a related action substantially in accordance with the following:

```
message UserSignals {
    optional string user_id = 1;
    optional string item_ id = 2;
    optional fixed32 timstamp = 3;
    repeated Feature features = 4;
```

-continued

```
    optional Action action_type = 5;
}
message Feature {
    optional string name = 1;
    optional float value = 2;
}
enum Action {
    SKIP = 0;
    CLICK = 1;
}
```

Responsive to grouping of, for example, all messages by individual users, an input signal sample value instance may be obtained substantially in accordance with:

```
public class User {
    String userID;
    List<UserSignal's> signals;
}
```

In embodiments, an advantage may be that a protocol message can be more easily serialized and methods to access parameters may be included. Accordingly, during development of a content recommendation system, low-level parameter manipulation details may be more effectively handled without devoting significant resources. Further, a unified parameter interface may be provided for additional parameters, for example.

Figure 4:
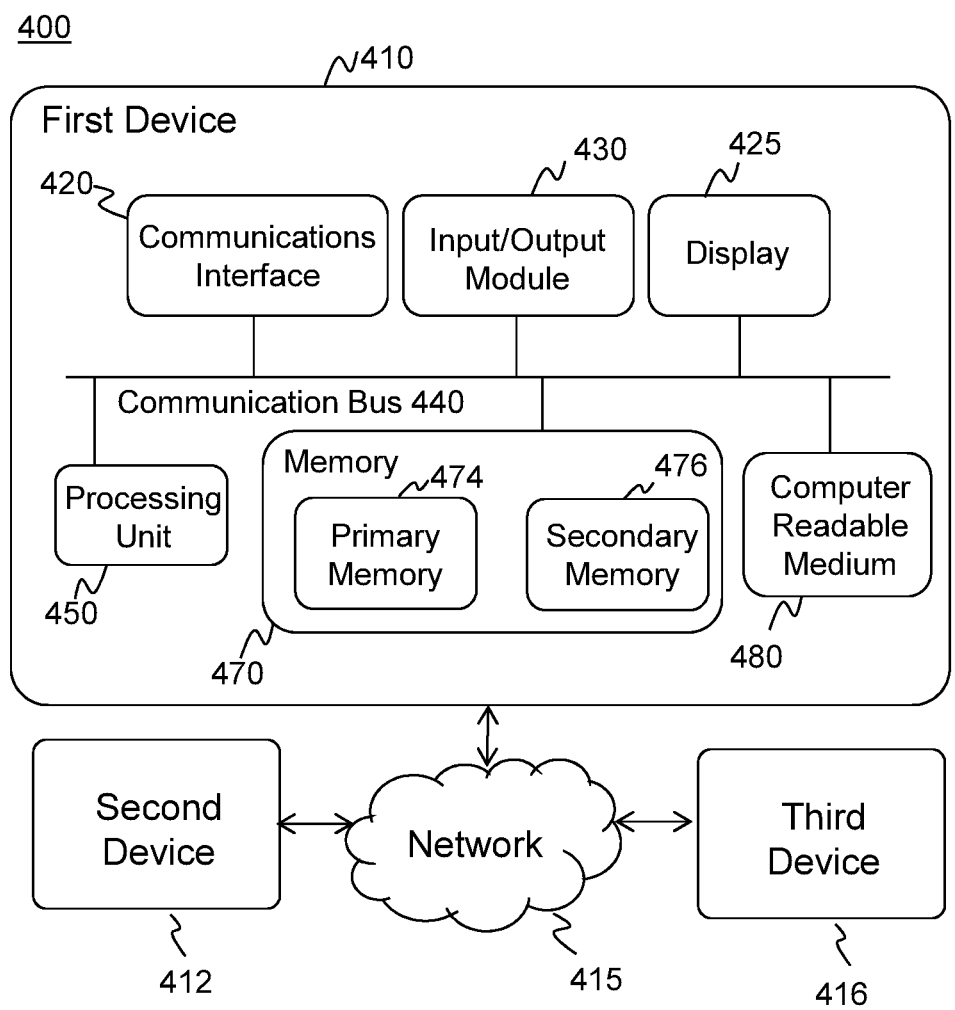
FIG. 4 is a schematic diagram of a system that may be employed in a client-server type interaction, according to an embodiment.

FIG. 4 is a schematic diagram of a system that may be employed in a client-server type interaction, according to an embodiment 400. In FIG. 4, computing device 410 (first device' in figure) may interface with client 412 (second device' in figure), which may comprise features of a client computing device, for example, which may permit a user to interact with content of various types. Communications interface 420, processor (e.g., processing unit) 450, and memory 470, which may comprise primary memory 474 and secondary memory 476, may communicate by way of communication bus 440, for example. In FIG. 4, client computing device 412 may represent one or more sources of analog, uncompressed digital, lossless compressed digital, and/or lossy compressed digital formats for content of various types, such as video, imaging, text, audio, etc. in the form physical states and/or signals, for example. Client computing device 412 may communicate with computing device 410 by way of a connection, such as an Internet connection, via network 415, for example. Although computing device 410 of FIG. 4 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 450 may be representative of one or more circuits, such as digital circuits, to execute at least a portion of a computing procedure and/or process. By way of example, but not limitation, processor 450 may comprise one or more processors, such as controllers, microprocessors, microcontrollers, application specific integrated circuits, digital signal processors, programmable logic devices, field programmable gate arrays, the like, or any combination thereof. In implementations, processor 450 may execute signal processing to manipulate signals and/or states, to construct signals and/or states, etc., for example.

Memory 470 may be representative of any storage mechanism. Memory 470 may comprise, for example, primary memory 474 and secondary memory 476, additional memory circuits, mechanisms, or combinations thereof may be used. Memory FIG. 4 is a schematic diagram of a system that may be employed in a client-server type interaction, according to an embodiment. May comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 470 may be utilized to store a program. Memory 470 may also comprise a memory controller (not shown in FIG. 4) for accessing computer readable-medium 480 that may carry and/or make accessible content, which may include code, and/or instructions, for example, executable by processor 450 and/or some other unit, such as a controller and/or processor, capable of executing instructions, for example.

Under direction of processor 450, memory, such as memory cells storing physical states, representing, for example, a program, may be executed by processor 450 and generated signals may be transmitted via the Internet, for example. Processor 450 may also receive digitally-encoded signals from client computing device 412.

Network 415 may comprise one or more network communication links, processes, services, applications and/or resources to support exchanging communication signals between a client computing device, such as 412, and computing device 416 ('third device' in figure), which may, for example, comprise one or more servers (not shown). By way of example, but not limitation, network 415 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than softwareer). Computing device 410, as depicted in FIG. 4, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may also comprise a computer-readable medium that may carry and/or make accessible content, including code and/or instructions, for example, executable by processor 450 and/or some other unit, such as a controller and/or processor, capable of executing instructions, for example. A user may make use of input/output module 430, such as a computer mouse, stylus, track ball, keyboard, and/or any other similar device capable of receiving user actions and/or motions as input signals, such as signals generated responsive to a user clicking on an icon, menu item, etc. Likewise, a user may make use of an output device, such as display 425, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computer-implemented method, comprising:
obtaining a plurality of latent factors for a plurality of users based on positive interactions and negative interactions by the plurality of users with a plurality of content items, a first negative interaction of the negative interactions indicating that a user has skipped an opportunity to select or click on at least one content item of the plurality of content items and that the user is disinterested in the at least one content item of the plurality of content items, a second negative interaction of the negative interactions indicating that the user spent less than a threshold period of time viewing a second content item, of the plurality of content items, comprising an article;
generating a plurality of latent factor vectors using the plurality of latent factors, including latent factors corresponding to the negative interactions, for the plurality of users, each of the plurality of latent factor vectors corresponding to a different one of the plurality of users;
generating a first latent factor matrix based, at least in part, on the plurality of latent factor vectors, including the latent factors corresponding to the negative interactions, and using a first stochastic gradient descent;
generating a plurality of content item features for the plurality of content items, each content item being represented by a corresponding subset of the plurality of content item features;
generating a second latent factor matrix using a second stochastic gradient descent, the second latent factor matrix mapping the plurality of content item features for the plurality of content items to the plurality of latent factors, including the latent factors corresponding to the negative interactions, for the plurality of users;
generating a user profile matrix based, at least in part, on the first latent factor matrix and the second latent factor matrix, wherein a first user profile, of a first user, associated with the user profile matrix comprises (i) a first component comprising a common mapping, shared between multiple users including the first user, from content item features to latent factors and (ii) a second component comprising latent factors of the first user, wherein a first feature is included in the first user profile responsive to the first user consuming content associated with the first feature at a consumption rate exceeding a threshold rate;
estimating relevance of a first content item to the first user based on an inner product of two or more latent factors, including at least one of the latent factors corresponding to the negative interactions, of the user profile matrix corresponding to the first user and the subset of the plurality of content item features corresponding to the first content item, wherein the two or more latent factors of the user profile matrix comprise a latent factor indicative of an interest of the first user in a first topic based on a determination that the first user interacted with one or more websites associated with a second topic and one or more other users that interacted with one or more websites associated with the second topic also interacted with one or more websites associated with the first topic; and
generating a recommendation of the first content item for the first user based on the relevance.

2. The method of claim 1, at least one of the positive interactions corresponding to a user click.

3. The method of claim 1, wherein the plurality of content item features comprises at least one of named entities, topical categories, noun-phrase tokens, or n-grams.

4. The method of claim 1, wherein the positive interactions are weighted more heavily than the negative interactions.

5. The method of claim 1, wherein obtaining the plurality of latent factors comprises:
applying a feedback matrix including a plurality of values, each of a first subset of the plurality of values representing a corresponding one of the positive interactions and each of a second subset of the plurality of values representing a corresponding one of the negative interactions.

6. The method of claim 5, each of the first subset of the plurality of values including a first value and each of the second subset of the plurality of values including a second value.

7. The method of claim 6, the first value being a positive value and the second value being a negative value.

8. The method of claim 1, each of the positive interactions being represented by a positive value and each of the negative interactions being represented by a negative value.

9. The method of claim 1, wherein at least one of generating the first latent factor matrix or generating the second latent factor matrix comprises applying at least one stochastic gradient descent until the first latent factor matrix and the second latent factor matrix converge.

10. The method of claim 1, wherein at least one of generating the first latent factor matrix or generating the second latent factor matrix comprises:
computing the first latent factor matrix and the second latent factor matrix according to a square loss approach.

11. An apparatus comprising:
one or more processors and memory configured to:
obtain a plurality of latent factors for a plurality of users based on positive interactions and negative interactions by the plurality of users with a plurality of content items, a first negative interaction of the negative interactions indicating that a user has skipped an opportunity to select or click on at least one content item of the plurality of content items and that the user is disinterested in the at least one content item of the plurality of content items, a second negative interaction of the negative interactions indicating that the user spent less than a threshold period of time viewing a second content item, of the plurality of content items, comprising an article;
generate a plurality of latent factor vectors using the plurality of latent factors, including latent factors corresponding to the negative interactions, for the plurality of users, each of the plurality of latent factor vectors corresponding to a different one of the plurality of users;
generate a first latent factor matrix based, at least in part, on the plurality of latent factor vectors, including the latent factors corresponding to the negative interactions, and using a first stochastic gradient descent;

generate a plurality of content item features for the plurality of content items, each content item being represented by a corresponding subset of the plurality of content item features;

generate a second latent factor matrix using a second stochastic gradient descent, the second latent factor matrix mapping the plurality of content item features for the plurality of content items to the plurality of latent factors, including the latent factors corresponding to the negative interactions, for the plurality of users;

generate a user profile matrix based, at least in part, on the first latent factor matrix and the second latent factor matrix, wherein a first user profile, of a first user, associated with the user profile matrix comprises (i) a first component comprising a common mapping, shared between multiple users including the first user, from content item features to latent factors and (ii) a second component comprising latent factors of the first user;

estimate relevance of a first content item to the first user based on an inner product of two or more latent factors, including at least one of the latent factors corresponding to the negative interactions, of the user profile matrix corresponding to the first user and the subset of the plurality of content item features corresponding to the first content item, wherein the two or more latent factors of the user profile matrix comprise a latent factor indicative of an interest of the first user in a first topic based on a determination that the first user interacted with one or more websites associated with a second topic and one or more other users that interacted with one or more websites associated with the second topic also interacted with one or more websites associated with the first topic; and generate a recommendation of the first content item for the first user based on the relevance.

12. The apparatus of claim 11, wherein the positive interactions are weighted more heavily than the negative interactions.

13. The apparatus of claim 11, the one or more processors and memory being configured to:
obtain the plurality of latent factors based, at least in part, on a feedback matrix including a plurality of values, each of a first subset of the plurality of values representing a corresponding one of the positive interactions and each of a second subset of the plurality of values representing a corresponding one of the negative interactions.

14. The apparatus of claim 11, each of the positive interactions being represented by a positive value and each of the negative interactions being represented by a negative value.

15. The apparatus of claim 11, the one or more processors and memory being configured to:
generate at least one of the first latent factor matrix or the second latent factor matrix by applying at least one stochastic gradient descent until the first latent factor matrix and the second latent factor matrix converge.

16. The apparatus of claim 11, the one or more processors and memory being configured to:
generate at least one of the first latent factor matrix or the second latent factor matrix using at least one stochastic gradient descent by computing the first latent factor matrix and the second latent factor matrix according to a square loss approach.

17. An apparatus comprising:
one or more processors; and
memory comprising instructions that when executed by at least one of the one or more processors perform operations comprising:

obtaining a plurality of latent factors for a plurality of users based on positive interactions and negative interactions by the plurality of users with a plurality of content items, a first negative interaction of the negative interactions indicating that a user has skipped an opportunity to select or click on at least one content item of the plurality of content items and that the user is disinterested in the at least one content item of the plurality of content items, a second negative interaction of the negative interactions indicating that the user spent less than a threshold period of time viewing a second content item, of the plurality of content items, comprising an article;

generating a plurality of latent factor vectors using the plurality of latent factors, including latent factors corresponding to the negative interactions, for the plurality of users, each of the plurality of latent factor vectors corresponding to a different one of the plurality of users;

generating a first latent factor matrix based, at least in part, on the plurality of latent factor vectors, including the latent factors corresponding to the negative interactions, and using a first stochastic gradient descent;

generating a plurality of content item features for the plurality of content items, each content item being represented by a corresponding subset of the plurality of content item features;

generating a second latent factor matrix using a second stochastic gradient descent, the second latent factor matrix mapping the plurality of content item features for the plurality of content items to the plurality of latent factors, including the latent factors corresponding to the negative interactions, for the plurality of users;

generating a user profile matrix based, at least in part, on the first latent factor matrix and the second latent factor matrix, wherein a first user profile, of a first user, associated with the user profile matrix comprises (i) a first component comprising a common mapping, shared between multiple users including the first user, from content item features to latent factors and (ii) a second component comprising latent factors of the first user;

estimating relevance of a first content item to the first user based on an inner product of two or more latent factors, including at least one of the latent factors corresponding to the negative interactions, of the user profile matrix corresponding to the first user and the subset of the plurality of content item features corresponding to the first content item, wherein the two or more latent factors of the user profile matrix comprise a latent factor indicative of an interest of the first user in a first topic based on a determination that the first user interacted with one or more websites associated with a second topic and one or more other users that interacted with one or more websites associated with the second topic also interacted with one or more websites associated with the first topic; and generating a recommendation of the first content item for the first user based on the relevance.

18. The apparatus of claim 17, wherein the positive interactions are weighted more heavily than the negative interactions.

19. The apparatus of claim 17, each of the positive interactions being represented by a positive value and each of the negative interactions being represented by a negative value.

* * * * *